United States Patent
Dickers et al.

(10) Patent No.: US 6,244,042 B1
(45) Date of Patent: Jun. 12, 2001

(54) METHOD FOR MONITORING AN INTERNAL COMBUSTION ENGINE

(75) Inventors: Guido Dickers, Moenchengladbach; Patrick Phlips, Cologne; Klemens Grieser, Langenfeld; Johann Himmelsbach, Lindler, all of (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/168,059

(22) Filed: Oct. 7, 1998

(51) Int. Cl.[7] ....................................... F01N 3/00
(52) U.S. Cl. ................. 60/274; 60/285; 123/436
(58) Field of Search ................ 60/274, 276, 285, 60/277; 123/436, 676, 352; 73/117.3, 118.1

(56) References Cited

U.S. PATENT DOCUMENTS

| | | | |
|---|---|---|---|
| 4,149,376 | * 4/1979 | Masaki et al. | 60/276 |
| 4,475,506 | * 10/1984 | Riordan | 123/352 |
| 4,776,312 | * 10/1988 | Yoshioka et al. | 123/436 |
| 5,293,853 | * 3/1994 | Berger et al. | 123/357 |
| 5,363,091 | * 11/1994 | Kotwicki et al. | 60/274 |
| 5,365,216 | * 11/1994 | Kotwicki et al. | 60/276 |
| 5,964,201 | * 10/1999 | Dickers et al. | 123/306 |

* cited by examiner

*Primary Examiner*—Jeanette Chapman
*Assistant Examiner*—Sneh Varma
(74) *Attorney, Agent, or Firm*—Jerome R. Drouillard

(57) ABSTRACT

A method is provided for monitoring the regulation of smooth running of a multi-cylinder internal combustion engine. The smooth running is regulated using at least one manipulated variable, which can be controlled by a control device, to influence the smooth running behaviour, and in which the measurement signals which correspond to temperatures on the catalytic converter are obtained.

16 Claims, 1 Drawing Sheet

METHOD FOR MONITORING AN INTERNAL COMBUSTION ENGINE

FIELD OF THE INVENTION

The invention relates to a method for monitoring the regulation of the smooth operation of an internal combustion engine in dependence on a measured value of the condition of the catalytic converter.

BACKGROUND AND PRIOR ART

For an internal combustion engine operating with a lean air/fuel mixture (lean burn engines), it is desirable to monitor operation thereof to ensure smooth operation. During lean burn operation, the formation of nitrogen oxides (NOx) can be decreased by operating the engine with as lean a mixture as possible. However, there are limits to the extent to which the strength of the air/fuel mixture can be a decreased, since if the mixture is too lean misfiring can occur which can lead to hunting, and in extreme cases, to stalling of the engine.

Efforts are therefore made in lean burn operation to operate the engine with as high an air/fuel ratio as possible (lean burn operation) while avoiding irregular running which may be perceptible to the driver. Thus to reduce nitrogen oxides emissions the engine has to be operated as close as possible to an irregular-running limit. The air/fuel ratio necessary to achieve this object can only be determined in advance very inexactly, since reaching the irregular-running limit depends on many parameters, some of which are subject to long-term or short-term drifting, for example the current engine operating parameters, the geometry of the combustion chambers, the quality of the mixture formation, the condition of the ignition system, etc. If a predetermined air/fuel ratio is used, the engine must be operated using a relatively large margin of safety from an air/fuel ratio corresponding to the irregular-running limit, and this has an unfavourable influence on the nitrogen oxides emissions.

It is basically known to measure the irregular running of an internal combustion engine. To obtain a measured value for the irregular running, it is preferred to evaluate the movement of the crankshaft. Increasing irregularity of running leads to more irregular running of the crankshaft, so that by means of statistical methods (e.g. comparison of the current angular velocity with an average value) a measured value can be determined which represents a measure of the irregular running.

OBJECT OF THE INVENTION

It is an object of the present invention to provide an improved method for monitoring the regulation of the smooth running of an internal combustion engine.

SUMMARY OF THE INVENTION

The present invention provides a method for monitoring the regulation of the smooth running of a multi-cylinder internal combustion engine in which the smooth running is regulated using at least one manipulated variable to influence the smooth running behavior, wherein measurement signals corresponding to at least one temperature at the catalyst are evaluated.

In lean burn operation the content of hydrocarbons (HC) and of oxygen in the "raw exhaust gas" increases at the limit of smooth running. The "raw exhaust gas" is defined as the composition of the exhaust gas before the catalytic converter. The hydrocarbons and the oxygen react in the catalytic converter with evolution of heat. With increased irregularity of running the HC content in the raw exhaust gas increases considerably. A greater quantity of heat is thereby liberated in the catalytic converter. This brings about increased heating up of the catalyst in the region of the outlet from the converter. By means of suitable sensors at the inlet and outlet of the converter the corresponding measurement signals, which represent a measure of the temperatures at the position of the sensors, are evaluated, in order to perform monitoring of the smooth running in dependence on a measured value generated from the measurement signals.

As the measured value for the monitoring of the smooth running, it is preferred to form the difference between the measurement signals at the inlet and outlet of the converter. The measurement signals can suitably be calibrated in advance.

The measured value for monitoring the smooth running is preferably formed from measurement signals at the HEGO (heated exhaust gas oxygen) sensors. These sensors have a temperature-dependent internal resistance which can be detected by means of a suitable measuring and evaluating device. With the increased evolution of heat on exceeding the irregular running limit the corresponding temperature change at the HEGO sensors can be read off through the change in their internal resistance. In order to obtain a measured value for the smooth running therefrom, the changes in the internal resistance of an HEGO sensor or its change with time can be used, but preferably both HEGO sensors or the changes in their internal resistance are invoked to form the measured value for monitoring irregular running. The difference can be compared with a reference value established by tests.

It can be provided, in accordance with the invention, that the threshold value for the monitoring of smooth running is varied in dependence on the speed and torque of the internal combustion engine by means of a functional connection (engine characteristic map). The characteristic map required is preferably determined by means of suitable series of tests.

It may also be provided that in the event that the reference value is exceeded the lean burn operation with smooth running control is abandoned and the engine is operated stoichiometrically.

BRIEF DESCRIPTION OF THE DRAWINGS

The invention will now be described, by way of example, with reference to the accompanying drawing, in which:

The FIGURE shows schematically the design of a suitable device for putting the invention into practice.

DETAILED DESCRIPTION OF A PREFERRED EMBODIMENT

Figure 1:
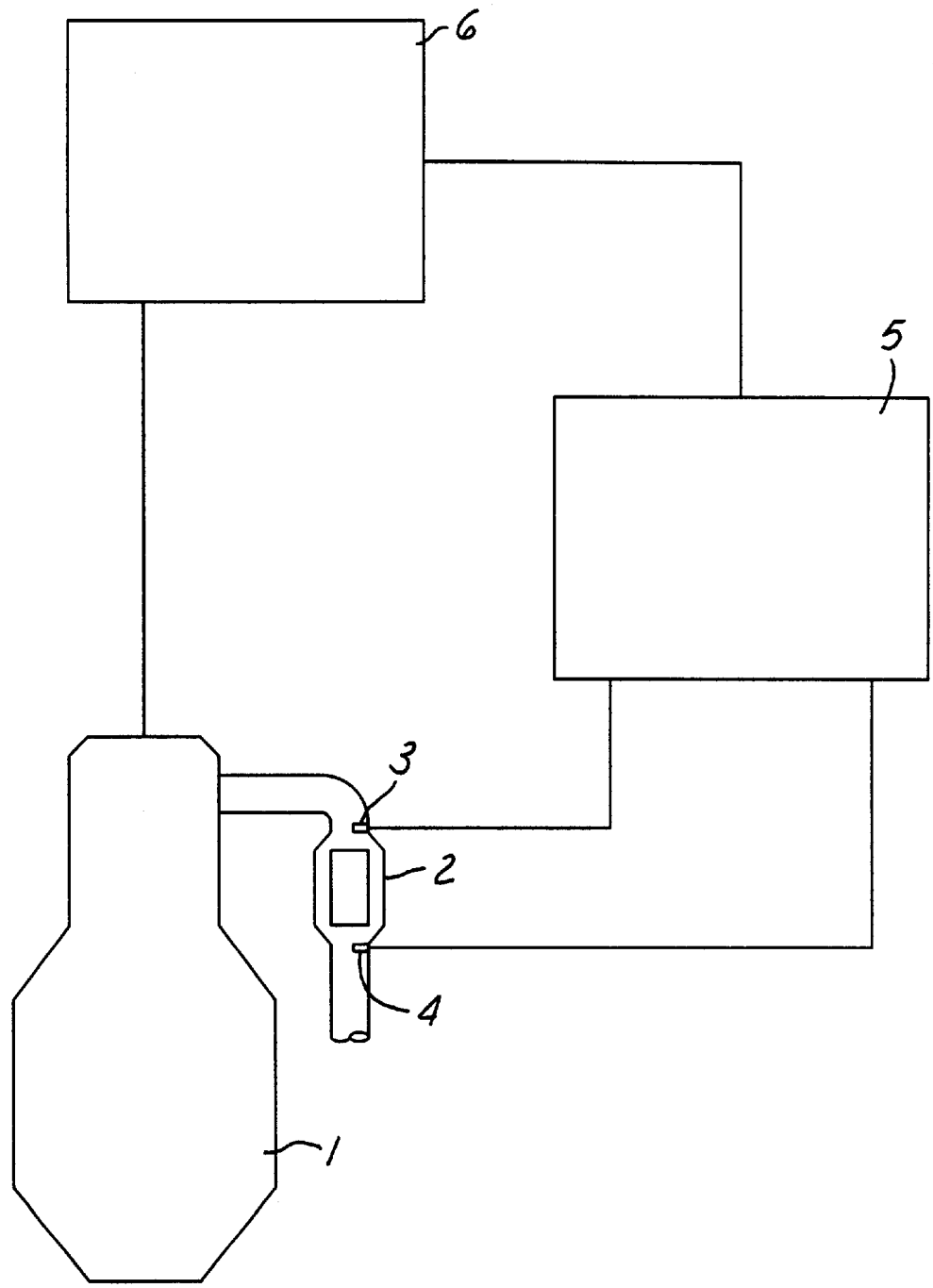

In the FIGURE, attached to the internal combustion engine 1 there is a catalytic converter 2, to which two HEGO sensors 3, 4 are fitted. Preferably the catalytic converter comprises a three-way converter. The HEGO sensors are connected to a measured value acquisition and evaluation unit 5. In this unit, beside the processing of the usual measurement signals from the sensors, the internal resistances are also specially processed and compared with a fixed threshold value. From this a manipulated variable is derived and fed to an actuator 6.

In a preferred embodiment, an internal combustion engine 1 operates with a lean air/fuel mixture (a lean burn engine). During lean burn operation, the NOx emissions are decreased by operating the engine 1 as lean as possible. To do this, the air and fuel intakes are modified to operate the engine 1 with as high an air/fuel ratio as possible while avoiding irregular running, preferably running the engine as close as possible to an irregular-running limit, including avoiding misfires.

Other engine operating parameters which may be modified include the current engine operating parameters, the geometry of the combustion chambers, the quality of the mixture formation, the condition of the ignition system, etc.

Thus, during lean burn operation, the content of hydrocarbons (HC) and of oxygen in the "raw exhaust gas" increases at the limit of smooth running. As described above, at this limit, the catalyst heats up in the region of the outlet from the converter 2. By means of suitable sensors 3, 4 at the inlet and outlet of the converter 2, the corresponding measurement signals, which represent a measure of the temperatures at the position of the sensors 3, 4, are evaluated to monitor the smooth running of the engine 1.

As the measured value for the monitoring of the smooth running, it is preferred to form the difference between the measurement signals at the inlet and outlet of the converter 2. The measurement signals can suitably be calibrated in advance.

The measured value for monitoring the smooth running is preferably formed from measurement signals at the HEGO (heated exhaust gas oxygen) sensors 3, 4. These sensors 3, 4 have a temperature-dependent internal resistance which can be detected by means of a suitable measuring and evaluating device. With the increased evolution of heat on exceeding the irregular running limit the corresponding temperature change at the HEGO sensors can be read off through the change in their internal resistance. In order to obtain a measured value for the smooth running therefrom, the changes in the internal resistance of an HEGO sensor or its change with time can be used, but preferably both HEGO sensors or the changes in their internal resistance are invoked to form the measured value for monitoring irregular running. The difference can be compared with a reference value established by empirical testing.

It can be provided, in accordance with the invention, that the threshold value for the monitoring of smooth running is varied in dependence on the speed and torque of the internal combustion engine 1 by means of a functional connection (an engine characteristic map). The characteristic map required is preferably determined by means of suitable series of tests.

It may also be provided that in the event that the reference value is exceeded the lean burn operation with smooth running control is abandoned and the engine is operated stoichiometrically.

The form of the invention shown and described herein constitutes a preferred embodiment of the invention. It is not intended to illustrate all possible forms thereof. The words used are words of description rather than of limitation, and various changes may be made from that which is described herein without departing from the spirit and scope of the invention.

What is claimed is:

1. A method for monitoring the regulation of the smooth operation of a multi-cylinder internal combustion engine, comprising:

manipulating an engine operating parameter, thereby influencing the smooth running behavior of the engine;
   using at least one HEGO sensor to generate a temperature of a catalytic converter after the parameter is manipulated; and
   evaluating the signal to determine whether the engine is operating smoothly.

2. A method as claimed in claim 1, wherein said at least one HEGO sensor is located at an inlet of the catalytic converter.

3. A method as claimed in claim 1, wherein said at least one HEGO sensor is located at an outlet of the catalytic converter.

4. A method as claimed in claim 3, wherein a second HEGO sensor is located at an inlet of the catalytic converter and a difference between the outputs of the HEGO sensors is determined and compared with a reference value.

5. A method as claimed in claim 4 wherein the operating parameter comprises an engine intake air/fuel ratio.

6. A method as claimed in claim 4, wherein the difference of the internal resistances of said two HEGO sensors are compared with a reference value.

7. A method as claimed in claim 4, wherein the engine operates at a speed and produces a torque for a given set of inputs, and wherein the reference value for monitoring the smooth running is varied in dependence on the speed and torque of the engine.

8. A method as claimed in claim 7, wherein the threshold value is determined from a characteristic map dependent on the speed and torque of the engine.

9. A method as claimed in claim 8 wherein the characteristic map is established empirically.

10. A method as claimed in claim 9 wherein the operating parameter comprises an engine intake air/fuel ratio.

11. A method as claimed in claim 7, further comprising the step of operating the engine stoichiometrically when the reference value is exceeded.

12. A method as claimed in claim 6, further comprising the step of operating the engine stoichiometrically when the reference value is exceeded.

13. A method for monitoring the regulation of the smooth operation of a multi-cylinder internal combustion engine, comprising:

manipulating an air/fuel ratio to the engine, thereby influencing the smooth running behavior of the engine;
   using a HEGO sensor to generate a temperature of a catalytic converter after the air/fuel ratio is manipulated; and
   evaluating the signal to determine whether the engine is operating smoothly.

14. A method as claimed in claim 1, wherein the HEGO sensor signal is located at an inlet of the catalytic converter.

15. A method as claimed in claim 14, wherein a second HERO sensor is located at an outlet of the catalytic converter and a difference between the first and second signals is determined and compared with a reference value.

16. A method as claimed in claim 15, wherein the engine operates at a speed and produces a torque for a given set of inputs, and wherein the reference value for monitoring the smooth running is varied in dependence on the speed and torque of the engine.

* * * * *